United States Patent
Fontalbat et al.

(10) Patent No.: US 11,834,158 B2
(45) Date of Patent: Dec. 5, 2023

(54) LANDING GEAR OF AN AIRCRAFT AND METHOD FOR COOLING AN ELECTRIC TAXIING MOTOR AND BRAKES OF SUCH A LANDING GEAR

(71) Applicants: SAFRAN ELECTRICAL & POWER, Blagnac (FR); SAFRAN LANDING SYSTEMS, Vélizy-Villacoublay (FR)

(72) Inventors: Thierry Fontalbat, Blagnac (FR); Loic Blanco, Blagnac (FR); Christophe Cassagnet, Blagnac (FR); Florent Challas, Blagnac (FR); Quentin Galy, Blagnac (FR); Eric Wissemer, Blagnac (FR); Sylvain Jaber, Moissy-Cramayel (FR)

(73) Assignees: SAFRAN ELECTRICAL & POWER, Blagnac (FR); SAFRAN LANDING SYSTEMS, Vélizy-Villacoublay (FR)

( * ) Notice: Subject to any disclaimer, the term of this patent is extended or adjusted under 35 U.S.C. 154(b) by 375 days.

(21) Appl. No.: 17/277,245

(22) PCT Filed: Sep. 17, 2019

(86) PCT No.: PCT/FR2019/052162
§ 371 (c)(1),
(2) Date: Mar. 17, 2021

(87) PCT Pub. No.: WO2020/058624
PCT Pub. Date: Mar. 26, 2020

(65) Prior Publication Data
US 2022/0024567 A1    Jan. 27, 2022

(30) Foreign Application Priority Data
Sep. 19, 2018 (FR) .................................. 1858486

(51) Int. Cl.
*B64C 25/32* (2006.01)
*B64C 25/42* (2006.01)
(Continued)

(52) U.S. Cl.
CPC .............. *B64C 25/405* (2013.01); *B60T 5/00* (2013.01); *B64C 25/42* (2013.01); *F16D 65/847* (2013.01); *H02K 9/04* (2013.01); *F16D 2065/787* (2013.01)

(58) Field of Classification Search
CPC ................................................... B64C 25/405
See application file for complete search history.

(56) References Cited

U.S. PATENT DOCUMENTS 8,528,856 B2 *   9/2013   Charles ................. B64C 25/405
                                                           244/50
2012/0104159 A1   5/2012   Charles
(Continued)

FOREIGN PATENT DOCUMENTS

DE    4235815 A1    4/1994
EP    3165455 A1    5/2017
(Continued)

OTHER PUBLICATIONS

International Search Report and Written Opinion received in corresponding international application No. PCT/FR2019/052162, filed Sep. 17, 2019, 10 pages.

*Primary Examiner* — Nicholas McFall
(74) *Attorney, Agent, or Firm* — Christensen O'Connor Johnson Kindness PLLC

(57) ABSTRACT

Aircraft landing gears include at least one wheel, an electric taxiing system including an electric taxiing motor, brakes capable of slowing down or stopping the rotation of the wheel, and a cooling system for cooling the electric taxiing motor and the brakes. The cooling system includes ventila- (Continued)

tion means capable of mixing a first air flow originating from the brakes and a second air flow originating from outside the landing gear and of ventilating the electric taxiing motor with a mixture of the two air flows.

11 Claims, 1 Drawing Sheet

(51) Int. Cl.
*B60T 5/00* (2006.01)
*F16D 65/847* (2006.01)
*H02K 9/04* (2006.01)
*F16D 65/78* (2006.01)

(56) References Cited

U.S. PATENT DOCUMENTS

2014/0292122 A1* 10/2014 Pal ................. B64C 25/405
                                                        310/59
2015/0266566 A1    9/2015 Ivandaev

FOREIGN PATENT DOCUMENTS

WO    2013123993 A1    8/2013
WO    2014202457 A1    12/2014

* cited by examiner

LANDING GEAR OF AN AIRCRAFT AND METHOD FOR COOLING AN ELECTRIC TAXIING MOTOR AND BRAKES OF SUCH A LANDING GEAR

TECHNICAL FIELD

The invention relates to a method of cooling both an electric motor of an electric taxiing system and brakes of a braking system of a landing gear of an aircraft.

The invention also relates to a landing gear of an aircraft comprising an electric taxiing system, a braking system and a system for cooling an electric motor of said electric taxiing system and brakes of said braking system.

BACKGROUND

The prior art comprises, but is not limited to, the patent applications WO-A1-2013/123993, US-A1-2012/104159, DE-A1-42 35 815, US-A1-2015/266566, EP-A1-3 165 455 and WO-A1-2014/202457.

In a known manner, an aircraft can be equipped with an electric taxiing system. Taxiing is an operation that groups together all of the taxiing steps of the aircraft before take-off and after landing of the aircraft.

Such an electric taxiing system comprises at least one electric motor arranged at the level of the main landing gear of the aircraft, and configured to drive in rotation at least one wheel of the main landing gear of the aircraft. The electric motor is typically powered by an auxiliary power unit (APU) of the aircraft.

Thus, an aircraft equipped with such an electric taxiing system can move on the ground autonomously, based on electric power, i.e., without using the turbojet engine or the turbojet engines of the aircraft or a towing system.

During operation, the electric motor heats up and therefore needs to be cooled. However, such an electric motor generally does not rotate fast enough to drive, in addition to the main landing gear wheel of the aircraft, a ventilation wheel that would generate a cooling flow for said electric motor.

As a result, the electric motor is cooled by means of a self-powered fan, i.e. a fan with its own motor. Nevertheless, this generates space problems at the level of the main landing gear of the aircraft where said electric motor is installed.

Moreover, the aircraft is equipped with a braking system arranged at the level of the main landing gear of the aircraft and comprising brakes configured to slow down, then stop the wheels of the main landing gear.

During operation, as the brakes heat up, it is necessary to cool them down. For this purpose, a brake ventilation system is mounted on the main landing gear, at the level of the wheel axis.

Such a ventilation system is for example represented on FIG. 1, and generally comprises a fan 4 (BCF, acronym of "Brake Cooling Fan") on the external side of the rim 1 which is configured to suck a discharge air flow of the brakes 2, represented by the arrows F, when said brakes 2 are activated to slow down, then to stop the wheel 3 of the main landing gear, and also during the stopping phase at the boarding gate. Thus, the fan BCF allows to cool down the brakes 2, as long as they are at a temperature higher than 300° C. During this phase the temperature of the air sucked in can reach 170° C. However, a BCF fan is bulky, which causes space problems in the main landing gear of the aircraft.

Thus, the electric taxiing system of the aircraft is separate from the brake ventilation system, and each system comprises its own fan configured to generate a cooling flow for the electric motor of the electric taxiing system or the brakes of the brake system.

Thus, there is a need for a system to combine the cooling of the electric taxiing motor and the cooling of the brakes, while reducing the weight and dimensions of such a system within the aircraft.

The present invention aims to provide a simple, economical and efficient solution to these problems, avoiding the drawbacks of the known technique.

OBJECTIVE OF THE INVENTION

The objective of the present invention is to provide a system and a method for coupling the cooling of the electric motor of the electric taxiing system and the brakes of the braking system of the landing gear of the aircraft.

SUMMARY OF THE INVENTION

To this end, the invention relates to a landing gear of an aircraft comprising:
at least one wheel,
an electric taxiing system comprising an electric motor, said electric taxiing motor, capable of rotating said at least one wheel, and
a braking system comprising brakes capable of slowing down or stopping the rotation of said at least one wheel, characterised in that it also comprises a system for cooling said electric taxiing motor and said brakes comprising ventilation means capable of mixing an air flow originating from said brakes and an air flow originating from outside of said landing gear and of ventilating said electric taxiing motor by means of said mixture of air flows, said ventilation means comprising a ventilation wheel configured to suck said mixture of air flows and a motor capable of rotating said ventilation wheel.

Advantageously, the landing gear according to the invention solves the problem of cooling the electric taxiing motor coupled with the cooling of the brakes of the landing gear of the aircraft.

In particular, the cooling system according to the invention advantageously makes it possible to perform the function of the BCF fan of the prior art to cool the brakes by means of the common ventilation means between said brakes and the electric taxiing motor. Indeed, the ventilation means allow to suck the air flow originating from said brakes, and thus to recover the high temperature air flow (about 170° C.) originating from the brakes, which allows to cool them down.

Moreover, the cooling system according to the invention advantageously allows to cool down the electric taxiing motor by means of the air flow originating from the brakes. Indeed, the ventilation means allow a mixture between the air flow at high temperature originating from the brakes and the air flow originating from outside the landing gear, i.e. at the ambient temperature of the landing/take-off runway of the aircraft, which allows to cool down the air flow originating from said brakes, then to use it for cooling down the electric taxiing motor. In particular, the mixture of the air flow from the brakes and the air flow from outside the landing gear makes it possible to homogenise the temperature of the cooling air of the electric taxiing motor.

The use of an electric taxiing system advantageously allows to reduce the fuel consumption of the aircraft (by about 4%) during the mobility of said aircraft on the ground.

Moreover, the cooling system of the brakes allows a ventilation of the brakes, which advantageously reduces the aircraft's downtime.

The landing gear of the aircraft may be the main landing gear of the aircraft.

Preferably, the ventilation means comprises a single ventilation wheel.

In other words, the ventilation wheel is configured to suck the air flow originating from the brakes and the air flow originating from outside the landing gear in parallel.

Thus, the cooling system according to the invention comprises only one ventilation wheel allowing to realize both the function of cooling the brakes and the function of cooling the electric taxiing motor by the mixture of the hot air flow originating from the brakes and the fresh air flow originating from outside the landing gear.

The motor and the ventilation wheel form an independent fan. This overcomes the fact that the electric taxiing motor does not rotate fast enough to drive both a wheel of the landing gear of the aircraft and a ventilation wheel capable of cooling it.

The ventilation means may comprise at least one series of fins positioned along the path of the mixture of the air flows.

Advantageously, this series of fins allows a dissipation of calories along the path of the mixture of the air flows.

Preferably, the ventilation means comprises a plurality of series of fins positioned along the path of the mixture of the air flows.

The fins of the or each series of fins may be arranged in a staggered pattern. This advantageously avoids the development of the boundary layer, which would disrupt the heat exchange between the electric taxiing motor and the air.

Preferably, the flow rate of the air flow originating from the brakes is lower than the flow rate of the air flow originating from outside the landing gear.

Advantageously, this makes it possible to have a temperature of the mixture of the air flows lower than the temperature of the air flow originating from the brakes, and thus to ensure the cooling function of the electric taxiing motor on the basis of said mixture of the air flows.

Furthermore, this allows to generate a flow rate of the air flow originating from the brakes sufficient for a correct cooling of said brakes.

The ventilation means of the ventilation system can be capable of mixing the air flows upstream of the electric taxiing motor.

The ventilation wheel of the ventilation means may be arranged downstream of the electric taxiing motor.

The ventilation wheel may be configured to suck the mixture of the air flows along the electric taxiing motor.

The at least one series of fins of the ventilation means may be positioned along the electric taxiing motor, in particular between upstream and downstream of said electric taxiing motor. In particular, the fins may be arranged above said electric taxiing motor.

Advantageously, this series of fins allows to dissipate the calories from the electric taxiing motor, along said electric taxiing motor.

Preferably, the ventilation means comprise a plurality of series of fins positioned between upstream and downstream of the electric taxiing motor along said electric taxiing motor.

The landing gear may comprise a cowl surrounding the braking system. The ventilation means may be arranged with a clearance with respect to said cowl.

Such a clearance between the ventilation means and the cowl allows the suction of an air flow originating from outside the landing gear.

The clearance between the ventilation means and the cowl may be shaped so that, in the mixture of the air flows, the flow rate of the air flow originating from outside the landing gear is greater than the flow rate of the air flow originating from the brakes.

The landing gear may comprise a gearbox connected to the electric taxiing motor and to the at least one wheel.

Advantageously, this allows an increase of the speed of rotation of the wheel.

The invention further relates to a method of cooling an electric motor, so-called electric taxiing motor, an electric taxiing system and brakes of a braking system of a landing gear of an aircraft according to the invention, characterised in that said cooling method comprises the steps of:
  mixing an air flow originating from said brakes and an air flow originating from outside said landing gear, and
  sucking said mixture of air flow so as to ventilate said electric taxiing motor.

DESCRIPTION OF FIGURES

The invention will be better understood and other details, features and advantages of the invention will become clearer upon reading the following description made by way of non-limiting example and with reference to the attached drawings in which.

DETAILED DESCRIPTION

Figure 1:
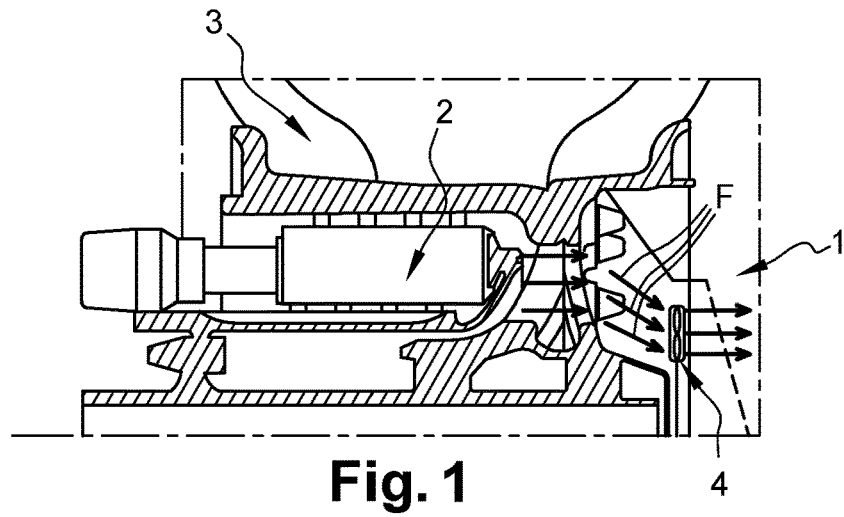
FIG. 1 is a schematic cross-sectional view of a portion of a landing gear of an aircraft according to the prior art as described above.
Figure 2:
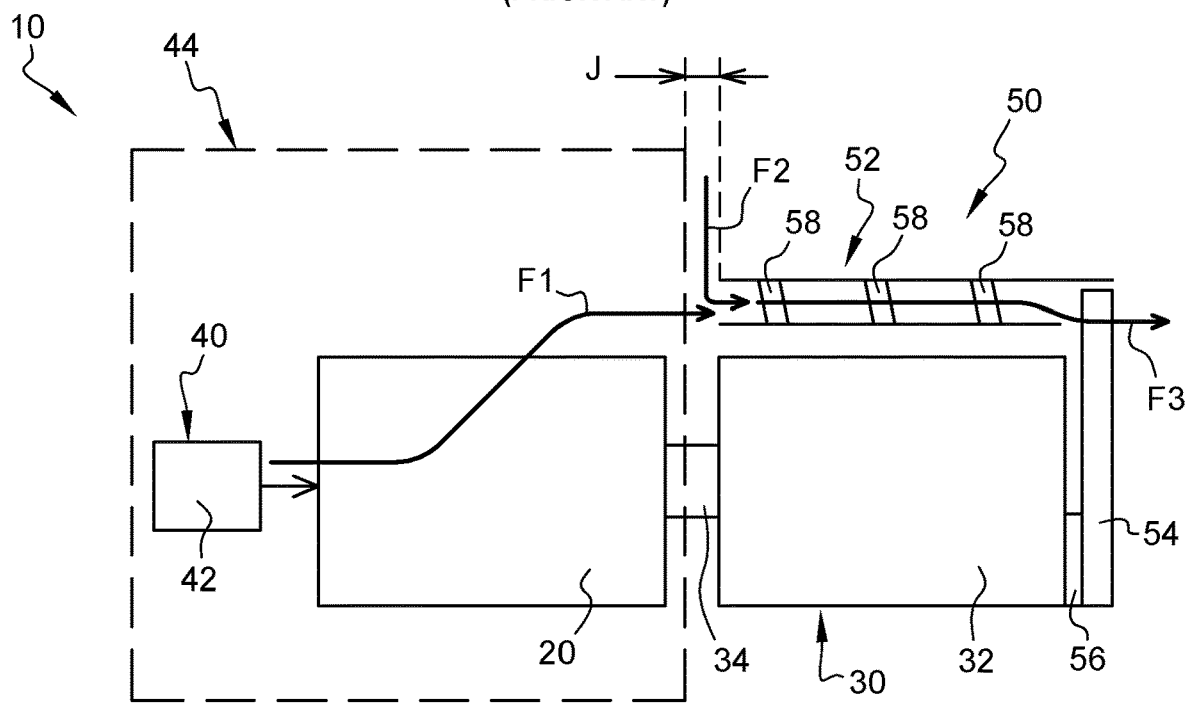
FIG. 2 is a schematic cross-sectional view of a landing gear of an aircraft according to the invention.

FIG. 2 shows a landing gear 10 of an aircraft according to the invention comprising at least one wheel 20, an electric taxiing system 30 and a braking system 40. The landing gear 10 may be the main landing gear of the aircraft.

The electric taxiing system 30 comprises an electric taxiing motor 32 capable of rotating the wheel 20. In particular, the electric taxiing motor 32 may be configured to rotate only the wheel 20. The electric taxiing motor 32 may be positioned directly on a hub (not shown) of the landing gear.

The electric taxiing system 30 may be connected to the wheel 20 via a gearbox 34. The gearbox 34 allows to increase the speed of rotation between the wheel 20 and the electric taxiing motor 32.

The braking system 40 comprises brakes 42 capable of slowing down and then stopping the rotation of the wheel 20. The brakes 42 may be disc brakes, for example brakes made of carbon.

A landing gear 10 may comprise a plurality of wheels 20 that may be rotated by an electric taxiing system 30 comprising at least one electric taxiing motor 32. For example, one of the wheels 20 or each wheel 20 may be rotated by the electric taxiing motor 32. The braking system 40 may comprise brakes 42 arranged on each wheel 20.

A cowl 44 may be arranged to surround at least the braking system 40. In FIG. 2, the cowl 44 is shown with a dashed line and surrounds both the wheel 20 and the braking system 40.

The landing gear 10 also comprises a cooling system 50 for the electric taxiing motor 32 and the brakes 42.

The cooling system 50 comprises ventilation means 52 (including, for example, a vent) capable of mixing an air flow originating from the brakes 42, noted F1, and an air flow originating from outside the landing gear 10, denoted F2.

The ventilation means 52 may be capable of mixing the air flows upstream of the electric taxiing motor 32.

In operation, the brakes 42 heat up, so that a high temperature air flow F1, in particular between 150° C. and 200° C., for example at about 170° C., is generated at the brakes 42. The ventilation means 52 are configured to suck this hot air flow F1 originating from the brakes 42, thereby cooling them.

The ventilation means 52 are also capable of ventilating the electric taxiing motor 32 by means of the mixture of air flows, noted F3.

The air flow F2 originating from outside the landing gear 10 is at the ambient temperature of the aircraft landing/take-off runway, in particular between 0° C. and 30° C., for example at about 15° C. The mixture of the air flow F2 originating from outside the landing gear 10 and the hot air flow F1 originating from the brakes 42 allows to cool down the air flow F1 originating from the brakes 42, and thus to homogenize the temperature of the mixture of the air flows F3. Then, this mixture of the air flows F3 is used to cool down the electric taxiing motor 32, in particular so that the electric taxiing motor 32 is at a temperature compatible with its operation.

The ventilation means 52 may be arranged with a clearance, noted J, with respect to the cowl 44. This clearance J forms a vent that allows the air flow F2 originating from outside the landing gear 10 to be sucked in.

In particular, the clearance J between the ventilation means 52 and the cowl 44 may be shaped so that, in the mixture of the air flows F3, the flow rate of the air flow F2 originating from outside the landing gear 10 is greater than the flow rate of the air flow F1 originating from the brakes 42. In other words, the flow rate of the air flow F1 originating from the brakes 42 is less than the flow rate of the air flow F2 originating from outside the landing gear 10 to ensure that the temperature of the mixture of the air flows F3 is lower than the temperature of the air flow F1 originating from the brakes 42.

The ventilation means 52 may comprise a ventilation wheel 54 configured to suck the mixture of the air flows F3. In particular, the ventilation wheel 54 sucks the air flow F1 originating from the brakes 42 and the air flow F2 originating from outside the landing gear 10 in parallel.

The ventilation wheel 54 can be arranged downstream of the electric taxiing motor 32. In this case, the ventilation wheel 54 may be configured to suck the mixture of the air flows F3 along the electric taxiing motor 32.

Here, the ventilation means 52 comprise only one ventilation wheel 54 for cooling both the brakes 42 and the electric taxiing motor 32.

The ventilation means 52 may comprise a motor 56 capable of rotating the ventilation wheel 54. The motor 56 and the ventilation wheel 54 thus form a self-powered fan. In particular, the motor 56 may be arranged at the end of the electric taxiing motor 32.

The ventilation means 52 may comprise one or a plurality of series of fins 58 positioned along the path of the mixture of the air flows F3 so as to remove the calories from the electric taxiing motor 32. In particular, the or each series of fins 58 may be positioned along the electric taxiing motor 32, in particular between upstream and downstream of said electric taxiing motor 32. In particular, the or each series of fins 58 may be arranged above the electric taxiing motor 32.

The fins of the or each series of fins 58 may be arranged in a staggered pattern. In other words, the fins of a series of fins 58 are not aligned along the electric taxiing motor 32.

The fins of the or each series of fins 58 may be identical, that is, they may have the same geometric and dimensional characteristics. Alternatively, the fins of the or each series of fins 58 may be different from each other.

The fins of the or each series of fins 58 may be longitudinally spaced apart by a constant spacing. Alternatively, the pitch between two fins in a same series of fins 58, or between the fins of two series of fins 58 may be variable.

Figure 3:
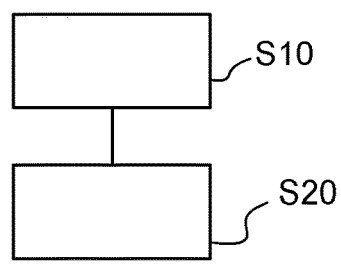
FIG. 3 is a flow chart of the steps of the method of cooling an electric motor of an electric taxiing system and brakes of a braking system of a landing gear of an aircraft according to the invention.

FIG. 3 shows the steps in the method of cooling an electric taxiing motor 32 and the brakes 42 of the landing gear 10 such as previously described.

The method may comprise a step of recovering the air flow F1 originating from the brakes 42, and a step of recovering the air flow F2 originating from outside the landing gear 10.

The method comprises a step S10 of mixing the air flow F1 originating from the brakes 42 and the air flow F2 originating from outside the landing gear 10.

The method also comprises a step S20 of sucking the mixture of the air flows F3 so as to ventilate the electric taxiing motor 32.

Prior to the step S10, the method may comprise a step of calibrating the clearance J between the cowl 44 and the ventilation means 52.

In particular, during the calibration step, the clearance J may be calibrated so that the flow rate of the air flow F1 originating from the brakes 42 is sufficient to provide the cooling of said brakes 42.

The invention claimed is:

1. A landing gear of an aircraft, comprising:
   at least one wheel;
   an electric taxiing system comprising an electric taxiing motor, said electric taxiing motor being configured to rotate said at least one wheel;
   a braking system comprising brakes configured to reduce a rotational rate of said at least one wheel; and
   a cooling system for cooling said electric taxiing motor and said brakes, the cooling system comprising ventilation means configured to mix a first air flow originating from said brakes and a second air flow originating from outside said landing gear to create a mixed third air flow, and configured to ventilate said electric taxiing motor with the mixed third air flow, wherein said ventilation means comprise a ventilation wheel configured to suck said mixed third air flow and a motor configured to rotate said ventilation wheel.

2. The landing gear according to claim 1, wherein said ventilation means comprise at least one series of fins positioned along a path of said mixed third air flow.

3. The landing gear according to claim 2, wherein the fins of said at least one series of fins are arranged in a staggered pattern.

4. The landing gear according to claim 1, further comprising a cowl surrounding said braking system, and wherein said ventilation means are arranged with a clearance with respect to said cowl.

5. The landing gear according to claim 1, further comprising a gearbox connected to said electric taxiing motor and to said at least one wheel.

6. The landing gear according to claim 1, wherein said ventilation means consists of the ventilation wheel.

7. The landing gear according to claim 1, wherein said ventilation means are arranged downstream of said electric taxiing motor with respect to a direction of air flow during taxiing.

8. The landing gear according to claim 3, wherein said at least one series of fins is positioned along said electric taxiing motor.

9. The landing gear according to claim 3, wherein said at least one series of fins is positioned above said electric taxiing motor.

10. A method for cooling an electric taxiing motor, an electric taxiing system, and brakes of a landing gear of an aircraft, the method comprising:

mixing a first air flow originating from said brakes and a second air flow originating from outside said landing gear; and sucking a third mixed air flow of the first air flow and the second air flow, so as to ventilate said electric taxiing motor.

11. A landing gear of an aircraft, comprising:

a wheel;

an electric taxiing motor configured to rotate the wheel;

brakes configured to reduce a rotational rate of the wheel; and a cooling system for cooling the electric taxiing motor and the brakes, the cooling system comprising a vent configured to mix a first air flow originating from the brakes and a second air flow originating from outside the landing gear to create a mixed third air flow, the cooling system being configured to ventilate the electric taxiing motor with the mixed third air flow, wherein the cooling system comprises a ventilation wheel configured to suck the mixed third air flow and a motor configured to rotate the ventilation wheel.

* * * * *